US012759903B2

(12) United States Patent
Gurtowski et al.

(10) Patent No.: US 12,759,903 B2
(45) Date of Patent: Oct. 13, 2026

(54) AMINE FUNCTIONALIZED CHITIN FOR REMOVING SUBSTANCES FROM SOLUTIONS

(71) Applicant: United States of America as Represented by The Secretary of The Army, Alexandria, VA (US)

(72) Inventors: Luke A Gurtowski, Vicksburg, MS (US); David P Martin, Clinton, MS (US); Christopher S Griggs, Vicksburg, MS (US); Manoj K Shukla, Vicksburg, MS (US); Christian T Hubley, Vicksburg, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 1058 days.

(21) Appl. No.: 17/488,311

(22) Filed: Sep. 29, 2021

(65) Prior Publication Data

US 2022/0176346 A1 Jun. 9, 2022

Related U.S. Application Data

(63) Continuation-in-part of application No. 16/144,954, filed on Sep. 27, 2018, now abandoned.

(Continued)

(51) Int. Cl.

| | |
|---|---|
| ***C02F 1/28*** | (2023.01) |
| ***B01J 20/24*** | (2006.01) |
| ***B01J 20/26*** | (2006.01) |
| ***B01J 20/32*** | (2006.01) |
| ***C02F 1/58*** | (2023.01) |

(Continued)

(52) U.S. Cl.

CPC ............... *C02F 1/285* (2013.01); *B01J 20/24* (2013.01); *B01J 20/265* (2013.01); *B01J 20/3212* (2013.01); *B01J 20/3248* (2013.01); *B01J 20/3251* (2013.01); *C02F 1/583* (2013.01); *C08B 37/003* (2013.01); *C02F 1/68* (2013.01); *C02F 2101/14* (2013.01); *C02F 2101/36* (2013.01)

(58) Field of Classification Search

None

See application file for complete search history.

(56) References Cited

U.S. PATENT DOCUMENTS

2014/0073775 A1* 3/2014 Blunn .................. B01J 20/3085 536/62

OTHER PUBLICATIONS

Shimizu et al. (Journal of Applied Polymer Science, 2007, 105, 2453-2460). (Year: 2007).*

(Continued)

*Primary Examiner* — Clare M Perrin

(74) *Attorney, Agent, or Firm* — Brian C. Jones; Lawrence A. Schemmel

(57) ABSTRACT

In one embodiment, a method of removing a substance from a solution by adsorption includes: interfacing a delivery component containing a quantity of amine functionalized chitin (AFC) compound as an adsorbent AFC compound with the solution containing the substance as an adsorbate substance; mixing the adsorbent AFC compound and the adsorbate substance in the solution for a period of time; and removing a mixture of the adsorbent AFC compound and at least a portion of the adsorbate substance from the solution.

17 Claims, 9 Drawing Sheets

R = OH, $HN(CH_2)_2NH_2$

DOF ~ 15%

Related U.S. Application Data

(60) Provisional application No. 62/574,732, filed on Oct. 19, 2017.

(51) Int. Cl.

| | |
|---|---|
| ***C08B 37/08*** | (2006.01) |
| *C02F 1/68* | (2023.01) |
| *C02F 101/14* | (2006.01) |
| *C02F 101/36* | (2006.01) |

(56) References Cited

OTHER PUBLICATIONS

Aly et al. (International Journal of Scientific Research, 2015, vol. 4, Issue 8, 1-9). (Year: 2015).*
Li et al. (AWWA Water Science, 2021, e1258, 1-22). (Year: 2021).*

* cited by examiner

Amine 2 (AM2)

Amine 1 (AM1)

Materials

- Adsorbents:
  - AFC
- Adsorbent mass used:
  - 34 mg
- Adsorbate:
  - PFOA
- Adsorbate volume:
  - 34 mL
- Adsorbate concentration
  - 0.25 µg/L (parts per billion [ppb])
  - 0.5 ppb
  - 5 ppb
  - 100 ppb
  - 250 ppb

Methods

- Three replicates analyzed for each adsorbate-adsorbent mixture
- Mixtures stored in 40-mL glass vials and agitated for at least 24 hours
- Sample concentrations quantified via LC-MS
  - Calibration: 0.05-500 ppb

Figure 8

| Property | AFC |
|---|---|
| Kf ((mg/g)*(L/mg)^1/n | 3851.4 |
| 1/n | 1.07 |
| Target Ce (mg/L) | 0.25 |
| **Capacity (mg/g)** | **876.6** |

- Freundlich model for removal
  - $q_e = K_f C_e^{1/n}$
    - $K_f$ = Freundlich constant for adsorption capacity
    - N = empirical constant for adsorption intensity
- Removal of ~100% observed regardless of concentration (A)

(B)

AMINE FUNCTIONALIZED CHITIN FOR REMOVING SUBSTANCES FROM SOLUTIONS

CROSS-REFERENCE TO RELATED APPLICATIONS

The application is a continuation-in-part of and claims the benefit of priority from U.S. patent application Ser. No. 16/144,954, filed on Sep. 27, 2018, entitled MOBILE SYSTEM AND METHOD FOR PFAS EFFLUENT TREATMENT, the disclosure of which is incorporated by reference in its entirety.

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to the field of renewable adsorbent material and, more specifically, to an amine-functionalized chitin (AFC) that can remove substances from solutions, the substances including, for example, munitions compounds or perfluoroalkyl or polyfluoroalkyl substances.

Description of the Related Art

This section introduces aspects that may help facilitate a better understanding of the invention. Accordingly, the statements of this section are to be read in this light and are not to be understood as admissions about what is prior art or what is not prior art.

The contamination of soil water from testing and disposal of munitions is a global concern. Common munitions (explosive) compounds such as Nitrotriazolone (NTO), 2,4-dinitroanisole (DNAN), and trinitrotoluene (TNT) can contaminate soil and groundwater are toxic, both acute and chronically. Munitions compounds are resistant to natural microbiological degradation. Even low levels can cause severe effects to an ecosystem. The Department of Defense (DoD) has estimated that, in the U.S. alone, munitions contaminated 15 million acres of land with clean-up costs ranging from $3-$35 billion.

Naturally occurring chitins have been successfully used to remove metal contaminants from water. However, the primary ingredient in common munitions compounds is nitrogen rather than metal. There are no naturally occurring chitins which bind to nitrogen and extract munitions contaminants at a high enough rate for effective remediation.

In addition, perfluoroalkyl and polyfluoroalkyl substances (PFASs) have been identified as chemicals of concern in the environment. As man-made contaminants, PFASs are environmentally persistent and ubiquitous. These substances are introduced into the environment via usage in numerous applications including aqueous film forming foam (AFFF) for fire suppression, food packaging, cookware, and stain-resistant carpet, clothing, and upholstery. They are known reproductive and developmental toxicants, endocrine disrupters, and possible carcinogens. Over 4,700 PFAS compounds have been identified in applications and the environment. At least 27 compounds are currently targeted by the Environmental Protection Agency (EPA). For example, Federal Health advisory level (HAL) has been established at 70 parts per trillion (ppt) for perfluorooctanoic acid (PFOA) and perfluorooctane sulfonic acid (PFOS). Some state regulations involve lower concentrations.

PFASs are considered "forever chemicals" based on their resistance to natural degradation such as biodegradation and ultraviolet degradation. The knowledge base for removal strategies is currently limited. Granular activated carbon (GAC) provides modest removal effectiveness. Ion exchange (IX) provides relatively high removal. Degradation strategies appear ineffective or energy intensive.

SUMMARY

The present invention was developed to address the desire for an effective approach to remove contaminants or other substances from solutions such as water. There is an unmet need for substances which can be produced in abundant supply to remove munitions compounds, PFASs, and the like from underground water supplies, lakes, rivers and tributaries and oceans on global scale. Research and development have led to a novel technique that enables effective removal of substances such as munitions solutions and PFASs.

Embodiments of the invention provide a method for forming an amine functionalized chitin compound that includes forming an aqueous chitin sodium hydroxide solution, forming a chloroform tosyl chloride solution, and combining the aqueous chitin sodium hydroxide solution and the chloroform tosyl chloride solution to form a solution with tosyl chitin. This solution separates into a target layer comprised of chloroform and tosyl chitin, and a hydrophilic layer which includes sodium hydroxide, chloride, and water. The tosyl chitin extracted from the target layer is added to a solution that contains amine group molecules. The solution with tosyl chitin and amine group molecules is heated until the tosyl chitin separates into tosyl molecules and chitin molecules. Then the amine group molecules replace the tosyl molecules and bind to the chitin molecules to create amine functionalized chitin molecules within solution.

According to an aspect the present invention, a method of removing a substance from a solution by adsorption comprises: interfacing a delivery component containing a quantity of amine functionalized chitin (AFC) compound as an adsorbent AFC compound with the solution containing the substance as an adsorbate substance; mixing the adsorbent AFC compound and the adsorbate substance in the solution for a period of time; and removing a mixture of the adsorbent AFC compound and at least a portion of the adsorbate substance from the solution.

In some embodiments, the delivery component comprises a receptacle containing the quantity of AFC compound or a material infused with the AFC compound. The AFC compound may include tosyl molecules or ethylenediamine. The AFC compound may include a solid that has been formed by evaporating a substance containing dimethyl sulfoxide (DMSO), tosyl chitin, dimethylformamide (DMF), ethylenediamine, and triethylamine.

In specific embodiments, mixing the adsorbent AFC compound and the adsorbate substance in the solution comprises agitating the adsorbent AFC compound and the adsorbate substance in the solution for the period of time. The mixture may be removed by capturing particles comprised of the mixture of the adsorbent AFC compound and at least a portion of the adsorbate substance. The mixture may be removed by filtration.

In some embodiments, the adsorbate substance comprises a munitions compound. The munitions compound may include TNT, DNAN, or NTO. The method may further comprise visually observing a color change of the adsorbent AFC compound upon interfacing with the adsorbate substance.

In specific embodiments, the adsorbate substance comprises a perfluoroalkyl or polyfluoroalkyl substance (PFAS). The PFAS may comprise perfluorooctanoic acid (PFOA). At least 99% of the PFOA is removed from the solution.

In some embodiments, the method further comprises visually observing any color change of the adsorbent AFC compound upon interfacing with the adsorbate substance and correlating the observed color change with a corresponding adsorbate substance.

In accordance with another aspect of this invention, a method of removing a PFAS from a solution comprises: interfacing a delivery component containing a quantity of amine functionalized chitin (AFC) compound as an adsorbent AFC compound with the solution containing the PFAS as an adsorbate PFAS; mixing the adsorbent AFC compound and the adsorbate PFAS in the solution for a period of time; and removing a mixture of the adsorbent AFC compound and at least a portion of the adsorbate PFAS from the solution.

In accordance with yet another aspect of the invention, a method of removing a munitions compound from a solution comprises: interfacing a delivery component containing a quantity of amine functionalized chitin (AFC) compound as an adsorbent AFC compound with the solution containing the munitions compound as an adsorbate munitions compound; mixing the adsorbent AFC compound and the adsorbate munitions compound in the solution for a period of time; and removing a mixture of the adsorbent AFC compound and at least a portion of the adsorbate munitions compound from the solution.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 8 summarizes the AFC materials and methods used in specific experiments for removing PFOA in solutions.

TERMS OF ART

As used herein, the term "2,4-dinitroanisole" (DNAN) means a munitions compound with the chemical structure of an anisole (methoxybenzene) core, with two nitro groups (—NO2) attached.

As used herein, the term "amine-exposed solution" means a solution with amine group molecules that are available for binding to other molecules.

As used herein, the term "amine functionalized chitin compound" ("AFC" compound) means a chitin molecule chain with N-acetylglucosamine units wherein each N-acetylglucosamine unit may have an amine group bound to it.

As used herein, the term "nitrotriazolone" (NTO) means a munitions compound with the chemical structure $C_2H_2N_4O_3$.

As used herein, the term "optimizing the yield of tosyl chitin by agitating" means creating motion within the solution to increase the interaction between tosyl group molecules and chitin molecules.

As used herein, the term "target layer" means a liquid layer containing dissolved tosyl chitin.

As used herein, the term "trinitrotoluene" (TNT) means a munitions compound with the chemical formula $C_6H_2(NO_2)_3CH_3$.

As used herein, the term "delivery component" means a material or container that brings AFC material into contact with a water sample or a slurry of water mixed with a solid such as soil.

As used herein, the term "infused" means containing AFC material that is affixed to, embedded within, woven into, or filling the object.

As used herein, the term "viewable interface" means an unobstructed surface of an object or transparent covering that allows an object to be seen.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
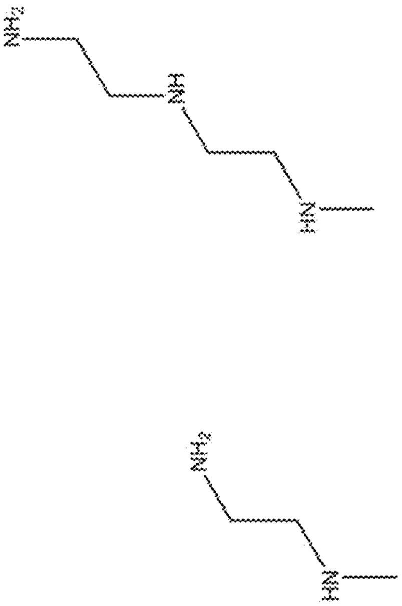
Figure 1 (prior art)
FIG. 1 illustrates chemical structures for amine functional groups AM1 and AM2 (prior art).

FIG. 1 illustrates two amine functional groups. AM1 is a chain with the following order of atoms: nitrogen, carbon, carbon, and nitrogen. AM2 is a chain with the following order of atoms: nitrogen, carbon, carbon, nitrogen, carbon, carbon, and nitrogen. Either amine functional group AM1 or AM2 may be attached to chitin to create Amine Functionalized Chitin (AFC) material. Nucleophiles such as amine groups can form complexes with nitroaromatic compounds such as munitions compounds.

Figure 2:
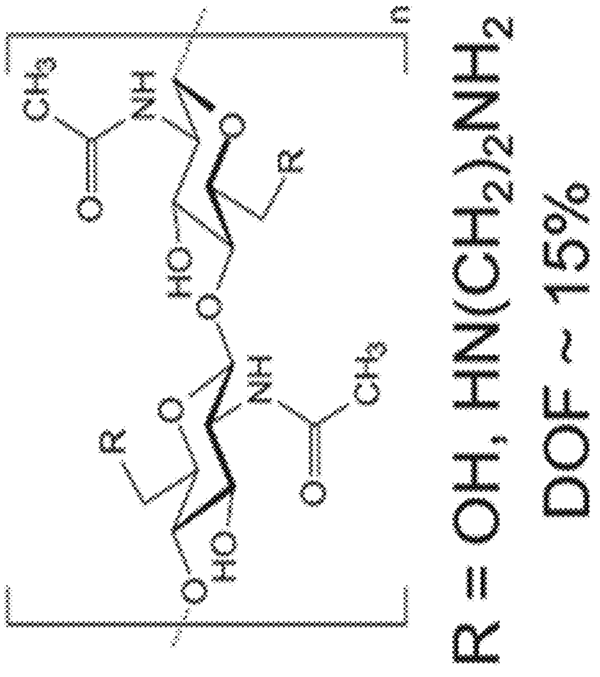
FIG. 2 illustrates an embodiment of the chemical structure for Amine-Functionalized Chitin ("AFC") material.

FIG. 2 illustrates an embodiment of the chemical structure for Amine-Functionalized Chitin ("AFC") material. One embodiment of AFC material shown is produced from chitin. Chitin is the world's second most abundant biopolymer, making it a renewable resource. Therefore, AFC material is a sustainable technology because its main ingredient is in high supply.

Chitin has the chemical formula $C_{16}H_{28}N_2O_{11}$ $(C_8H_{13}NO_5)_n$, with n number of N-acetylglucosamine units. In the embodiment shown, an amine group with the following order of atoms: nitrogen, carbon, carbon, and nitrogen may be bound to each N-acetylglucosamine unit in the chitin chain (represented in FIG. 2 as functional group R). The molecule has a degree of freedom measurement of approximately 15%. In various embodiments, alternative amine groups may be bound to each N-acetylglucosamine unit in the chitin chain.

Removal of Munitions Compounds

The embodiment of AFC shown detects target substances such as munitions compounds in solutions such as water, including Nitrotriazolone (NTO), 2,4-dinitroanisole (DNAN), and trinitrotoluene (TNT). AFC material may be used as a renewable adsorbent for traditional and insensitive munition (IM) compounds. Compared to traditional munition compounds, insensitive munition compounds resist exploding when exposed to heat, shock, or the explosions of nearby munition. In the embodiment shown, AFC in solid powder form displays a tan hue before operation. For the embodiment shown, when AFC is exposed to NTO, DNAN, or TNT in solution, the material immediately begins to change color. A steady-state (final) color is reached by 24 hours of exposure, according to preliminary lab evaluations; however, this color is likely reached within a much shorter time span.

In various embodiments, AFC material will also react in the presence of a slurry made of munitions compound-contaminated soil mixed with water.

Regardless, each contaminant causes a distinct color change to AFC, allowing for the detection of the specific component. When exposed to NTO, this embodiment of AFC changes to light yellow. When exposed to DNAN, this embodiment of AFC changes to yellow. When exposed to TNT, this embodiment of AFC changes to a pink color. The intensity of this color depends upon the concentration of the contaminant within solution to which AFC is exposed. Therefore, expedient quantification of the contaminants is expected using this technology.

AFC material may be used as a renewable adsorbent for insensitive munition (IM) compounds. Based upon its pH dependence, it may be used as a regenerative adsorbent. Additionally, the material may be used for the purification of IMs including but not limited to NTO, DNAN, or TNT. The color change associated with the adsorption could be used for detection and colorimetric detection of IM compounds. This adsorbent material could potentially provide these benefits relative to other military materials, as well. This material could be used as a renewable adsorbent for non-military contaminants. Based on its pH dependence, this material could be used as an easily regenerative absorbent for certain compounds. The selectivity of this adsorbent could provide purification of certain industrial waste streams. The color change associated with adsorbent could be used in sensing and quantification applications.

Additional advantages to using AFC material include increased sustainability of water treatment technology, and improved cost efficiency of water treatment for insensitive munition (IM) compounds. Using AFC material also provides colorimetric detection of traditional and insensitive munitions compounds when used as a sensing application, clear detection of munitions constituents, and expedited quantification of munitions constituents.

AFC material is also useful for sustainable removal of traditional and insensitive munition compounds from solution via adsorption, effective separation and purification of IM compounds, regenerative adsorption of insensitive munition compounds via pH adjustment, and separation and purification of insensitive munition compounds via selective adsorption. Other potential contaminants could be removed from solution, detected, or quantified using this technology.

PFAS

When AFC is added to solutions containing NTO, DNAN, and TNT, it removes these contaminants from solution via adsorption. This removal is pH-dependent, however, and is maximized at neutral pH levels. The pH dependence provides an additional benefit in that NTO can be desorbed at certain pH levels. This feature regenerates the adsorbent and extends its life. Additionally, NTO can be separated and purified from the other components.

Lastly, certain munition compounds, including nitroguanidine (NQ) are impervious to various embodiments of AFC material. AFC material can selectively adsorb energetic compounds. This selective adsorption provides further separation and purification of the material. This property has not been observed for other commonly used adsorbents.

Figure 3:
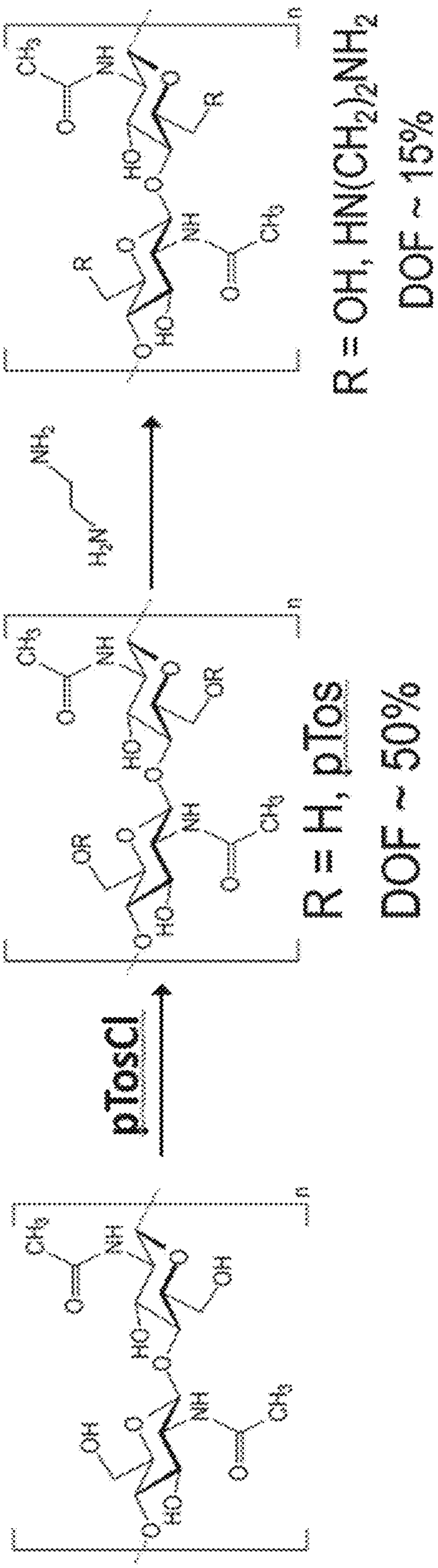
FIG. 3 illustrates an embodiment of method 200 for synthesizing Amine-Functionalized Chitin ("AFC") material.

FIG. 3 illustrates an embodiment of method 200 for synthesizing Amine-Functionalized Chitin ("AFC") material. In the embodiment shown, synthesis of AFC material uses chitin and an amine-bearing organic material.

Step 1 is the step of adding a tosyl group to chitin.

Step 2 is the step of replacing the tosyl group with an amine functional group to create AFC material. "R" represents any amine group, but in the embodiment shown, it represents the amine group AM1 as depicted in FIG. 1, having a chain of atoms in the sequence nitrogen, carbon, carbon, nitrogen. In the embodiment shown, ethylenediamine provides the amine group AM1 for the reaction.

In an alternative embodiment, instead of an amine group, a thiol group replaces the tosyl group in Step 2.

In an alternative embodiment, chitosan or any polysaccharide may replace the chitin starting material. The synthesis method would be adjusted to accommodate the solubility of the chitosan or polysaccharide.

Figure 4:
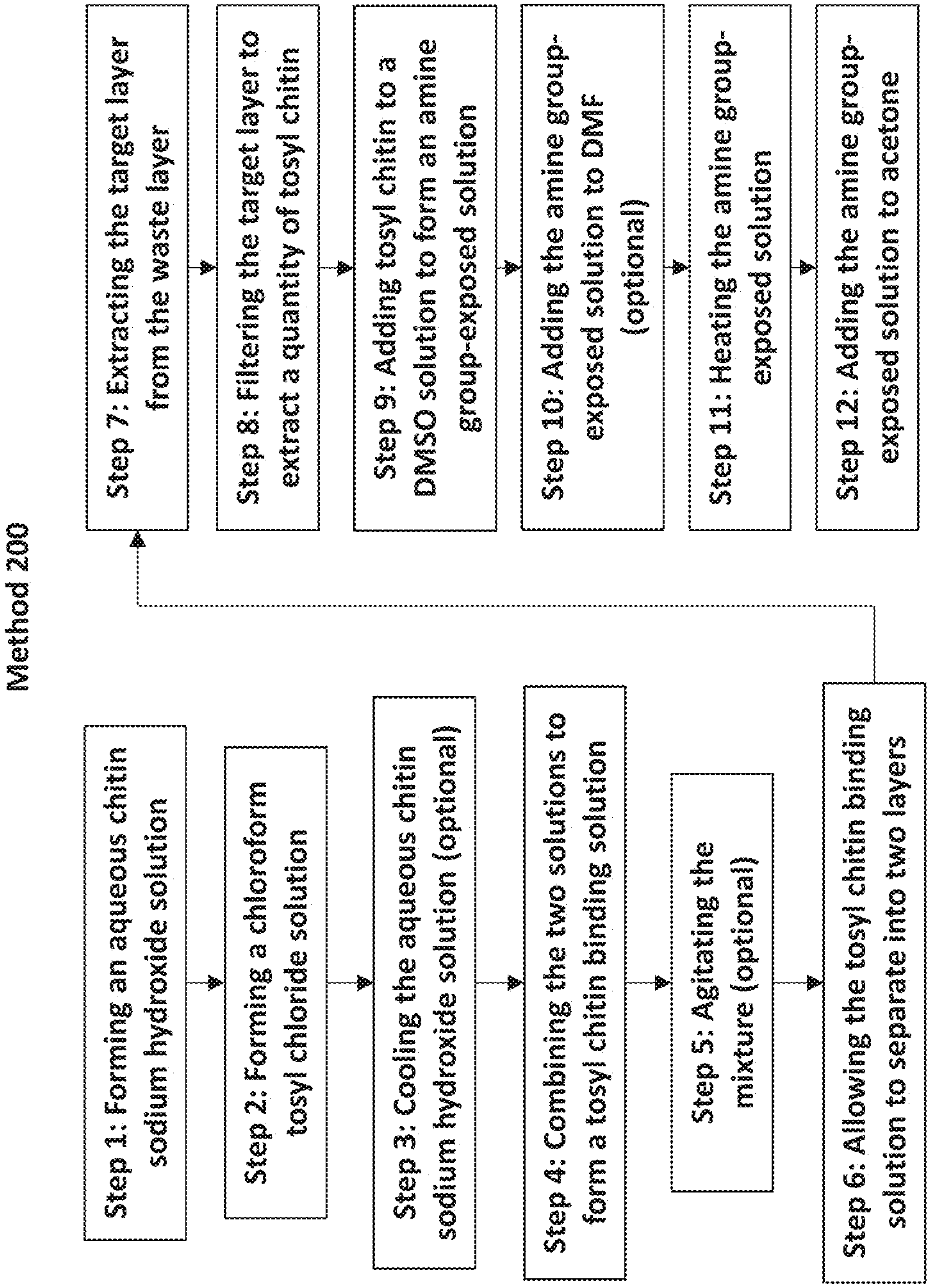
FIG. 4 illustrates an embodiment of detailed method 200 for synthesizing Amine-Functionalized Chitin ("AFC") material.

FIG. 4 illustrates an embodiment of method 200 for synthesizing Amine-Functionalized Chitin ("AFC") material. In the embodiment shown, synthesis of AFC material uses chitin and an amine-bearing organic material. In the embodiment shown, synthesizing AFC material includes the addition of a tosyl group to chitin, and the subsequent replacement of the tosyl group with an amine functional group. Because AFC is produced mostly from chitin, a renewable resource and the world's second most abundant biopolymer; it is a sustainable technology. Utilization of this material is favored because of this feature.

Step 1 is the step of forming an aqueous chitin sodium hydroxide solution in a first container.

In one embodiment, step 1 is the step of stirring 100 millimoles or mmol (4 grams) of sodium hydroxide (chemical formula NaOH) in 10 milliliters (mL) of water (chemical formula $H_2O$) at room temperature until the sodium hydroxide has dissolved.

After dissolving the sodium hydroxide, step 1 further includes the step of stirring 3.05 mmol (500 milligrams or mg) of chitin (chemical formula $C_{16}H_{28}N_2O_{11}(C_8H_{13}NO_5)_n$) in the aqueous sodium hydroxide solution until the chitin has dissolved. In this embodiment, stirring for approximately 15 minutes dissolved the chitin in the solution.

Step 2 is the step of forming a chloroform tosyl chloride solution in a second container.

In one embodiment, step 2 is the step of dissolving 45.8 mmol (8.7 grams) of tosyl chloride (chemical formula $CH_3C_6H_4SO_2Cl$) in 20 mL of chloroform (chemical formula $CHCl_3$).

Step 3 is the optional step of cooling the aqueous chitin sodium hydroxide solution.

In one embodiment, the aqueous chitin and sodium hydroxide mixture cools in an ice bath, and continues to cool for a total of 2 hours, while being stirred.

Step 4 is the step of combining the aqueous chitin sodium hydroxide solution and the chloroform tosyl chloride solution to form a tosyl chitin binding solution. The tosyl chitin binding solution yields tosyl chitin, which has a tosyl group bound to each N-acetylglucosamine unit in the chitin chain.

In one embodiment, the chloroform tosyl chloride solution is added to the aqueous chitin sodium hydroxide solution while it is stirred and cooled in an ice bath.

The reaction that occurs when these solutions are combined releases a significant amount of heat, so cooling the mixture avoids flash boiling of the organic layer.

Step 5 is the optional step of agitating the mixture. This step maximizes the interaction between the two layers of solution (the water (i.e., aqueous or hydrophilic) layer and the chloroform (i.e., organic or hydrophobic layer). Maximizing the interaction between these two layers increases the exposure of tosyl group molecules to chitin molecules. In other words, the synthesis method allows the tosyl chitin binding solution to separate into a target layer (aqueous) and a hydrophilic waste layer to extract the target layer from the waste layer. The target layer may be comprised of chloroform and tosyl chitin and the hydrophilic waster layer may include sodium hydroxide, chloride, and water.

In one embodiment, step 5 is the step of removing the mixture from the ice bath after 2 total hours of cooling and stirring the mixture at room temperature for 2 hours.

Step 6 is the step of solidifying the tosyl chitin in solution.

In one embodiment, the mixture is poured into 100 mL of water ($H_2O$), which causes the tosyl chitin to solidify (i.e., precipitate) within the solution.

Step 7 is the step of washing the solid tosyl chitin.

In one embodiment, the step of washing is achieved by repeated decanting. In this embodiment, the solid tosyl chitin is maintained in the container while excess liquid is poured into a separate container and discarded. The target layer is extracted. In one embodiment, this decanting process, where water is added to the solution containing the solid tosyl chitin, then the solid tosyl chitin is maintained in the container while excess liquid is discarded, is repeated several times.

Step 8 is the step of filtering to extract a quantity of tosyl chitin.

In one embodiment, a 10 cm vacuum filter is used to process the solid tosyl chitin and the solution containing it. Any liquid passes through the vacuum filter, leaving the tosyl chitin in solid form on the filter, then water ($H_2O$) passes through the filter to wash the solid tosyl chitin, then methanol (MeOH) passes through the filter to remove any remaining tosyl chloride from the solid tosyl chitin. The water and methanol wash steps are repeated several times, then the vacuum dries the solid tosyl chitin on the filter so that the solid tosyl chitin may be collected by scraping the dried solid from the filter. In other words, the target layer is filtered to extract a quantity of tosyl chitin.

Step 9 is the step of adding the extracted tosyl chitin to a DMSO solution to create an amine group-exposed solution.

In one embodiment, this DMSO solution includes dimethyl sulfoxide (DMSO) and a source of amine group molecules.

In one embodiment, this DMSO solution includes a 40 mL of DMSO, 283 mg of triethylamine, and 1.68 g of ethylenediamine for each 1 gram of said tosyl chitin added to this DMSO solution. Ethylenediamine provides the AM1 functional group shown in FIG. 1. This creates a solution with amine groups that are available for binding.

In one embodiment, the tosyl chitin DMSO solution is stirred at room temperature to dissolve all solids.

Step 10 is the optional step of adding the amine group-exposed solution to dimethylformamide (DMF).

This step tests whether a water-soluble product exists. In one embodiment, the amine group-exposed solution is poured into 25 mL of DMF.

Step 11 is the step of heating the amine group-exposed solution.

This step includes heating the amine group-exposed solution until the tosyl groups separate from the chitin molecules and the amine group molecules bind to the chitin molecules to create amine functionalized chitin molecules within the DMSO solution.

Heating speeds up the reaction, which (along with using a large excess of amine) helps avoid crosslinking (i.e., the amine of a functionalized chitin molecule reacting with an unfunctionalized chitin to form a bridging ethylene group).

In one embodiment, the amine group-exposed solution is heated to 70° C. and held at that temperature for 8-16 hours.

Step 12 is the optional step of pouring the amine group-exposed solution into acetone.

This step isolates the amine functionalized chitin molecules in a solid form. In one embodiment, the amine group-exposed solution is poured into 250 mL of acetone. This step causes the amine functionalized chitin molecules to precipitate into solid form in the solution, to facilitate collection of solid AFC material.

In an alternative embodiment of Method 200, chitin (30 g) and NaOH (100 g) were added to 250 mL water and stirred overnight, then cooled in an ice bath with continuous stirring. Tosyl chloride (250 g) dissolved in chloroform (400 mL) and was then added to the chitin NaOH solution with vigorous stirring. The biphasic mixture was stirred for a total of 4 h, and was allowed to warm to room temperature after 2 h. The mixture was then poured into 1 L of water, which resulted in precipitation of the product. The mixture was decanted and washed with several 500 mL aliquots of water until the pH of the supernatant was neutral. The product was then filtered and washed several times with methanol to remove any remaining tosyl chloride before drying at 60° C. Yield: 37.4 g. The degree of functionalization was estimated to be 50% based on elemental analysis (47.63% C, 5.58% H, 4.57% N, 5.76% S; starting material 43.59% C, 6.83% H, 6.01% N, 0.6% S) and the presence of the tosyl group was confirmed by the appearance of characteristic IR absorption peaks (aromatic C—H bending at 814 nm, symmetric $SO_2$ stretching at 1177 nm).

In one embodiment that replaced the tosyl group with amine group 1 (AM1) as depicted in FIG. 1, a mixture of ethylenediamine (50 mL) and DMSO (300 mL) was heated to 50° C. prior to the addition of chitin-pTos (35 g). The solution was then heated to 70° C. for 24 h and allowed to cool to room temperature. The mixture was poured into acetone (750 mL) and the resulting precipitate was filtered and washed several times with methanol before drying at 60° C. The degree of functionalization was estimated to be 15% based on elemental analysis (45.75% C, 6.42% H, 8.13% N, 1.47% S) with tosyl group removal confirmed by the disappearance of the characteristic IR absorption peaks.

In one embodiment that replaced the tosyl group with amine group 2 (AM2) as depicted in FIG. 1, a mixture of diethylenetriamine (50 mL) and DMSO (50 mL) was heated to 70° C. prior to the addition of chitin-pTos (35 g). The solution was then heated to 70° C. for 24 h and allowed to cool to room temperature. The mixture was poured into acetone (750 mL) and the resulting precipitate was filtered and washed several times with methanol before drying at 60° C. The degree of functionalization was estimated to be 7% based on elemental analysis (45.52% C, 6.49% H, 7.94% N, 1.33% S).

Figure 5:
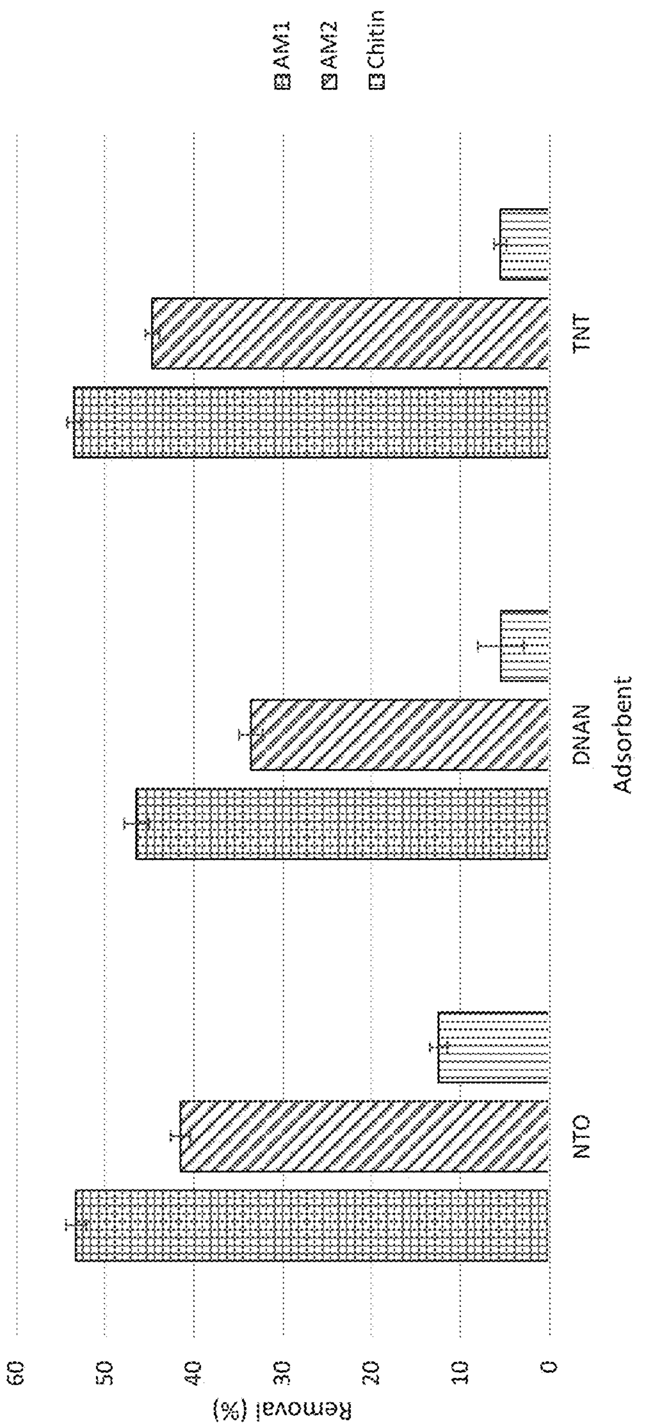
FIG. 5 illustrates example removal percentages of NTO, DNAN, and TNT from solution by two embodiments of AFC material.

FIG. 5 illustrates example removal percentages of NTO, DNAN, and TNT from solution by two embodiments of AFC material.

In this embodiment, AFC material (in a quantity of 100 grams) extracted nitrotriazolone (NTO), 2,4-dinitroanisole (DNAN), or trinitrotoluene (TNT) individually from three separate solutions with a volume of 10 mL and a concentration of 10 mg/L. The AFC experienced color changes related to the munitions compound to which it was exposed. NTO, DNAN, and TNT provided light yellow, dark yellow, and pink hues, respectively (not shown).

Quantitative analysis via High Performance Liquid Chromatography (HPLC) showed that AFC functionalized with amine group 1 (AM1, depicted in FIG. 1) removed approximately 50% of each munitions constituent from solution after 24 hours of exposure. The AFC functionalized with amine group 2 (AM2, depicted in FIG. 1) removed approximately 40% of each munitions constituent from solution after 24 hours of exposure.

Plain chitin extracted between 5% and 12% of the munitions compounds from solution.

Figure 6:
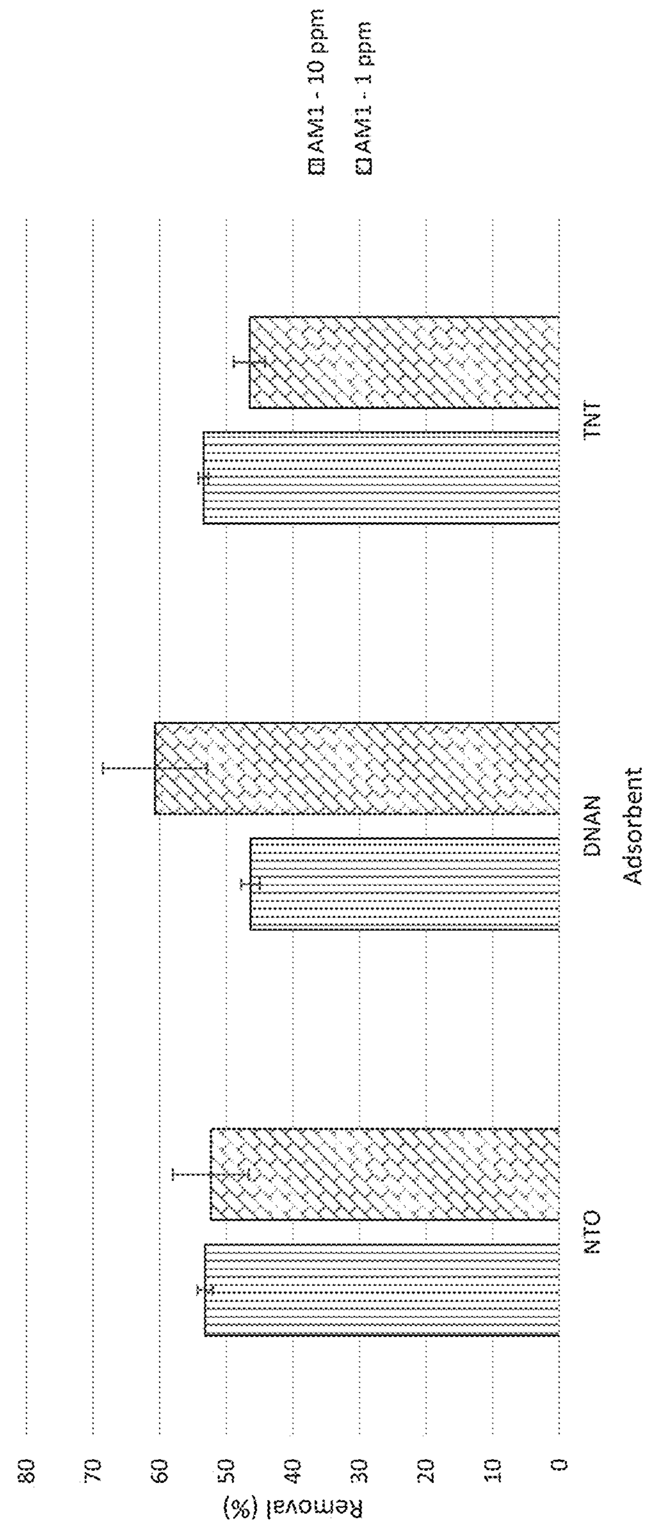
FIG. 6 illustrates example removal percentages of varying concentrations of NTO, DNAN, and TNT by AFC material.

FIG. 6 illustrates example removal percentages of varying concentrations of NTO, DNAN, and TNT by AFC material.

The AFC material (in a quantity of 100 grams) extracted nitrotriazolone (NTO), 2,4-dinitroanisole (DNAN), or trinitrotoluene (TNT) individually from three separate solutions with a volume of 10 mL and a concentration of either 10 mg/L (10 ppm) or 1 mg/L (1 ppm). Quantitative analysis via High Performance Liquid Chromatography (HPLC) showed that AFC functionalized with amine group 1 (AM1, depicted in FIG. 1) removed approximately 50% of each munitions constituent from each munition solution after 24 hours of exposure, at both concentrations.

When 100 grams of AFC encountered 1 mg/L concentrations of munitions solutions, the color changes were less intense than when AFC encountered 10 mg/L solutions (not shown). When 100 grams of AFC encountered 50 mg/L concentrations of munitions solutions in 18.2 MΩ water, the color changes were more intense than when AFC encountered 10 mg/L solutions (not shown). These data indicate a dependence of the color intensity on the concentration of the munition compound in solution, providing a potential for not only detection but also quantification.

Figure 7:
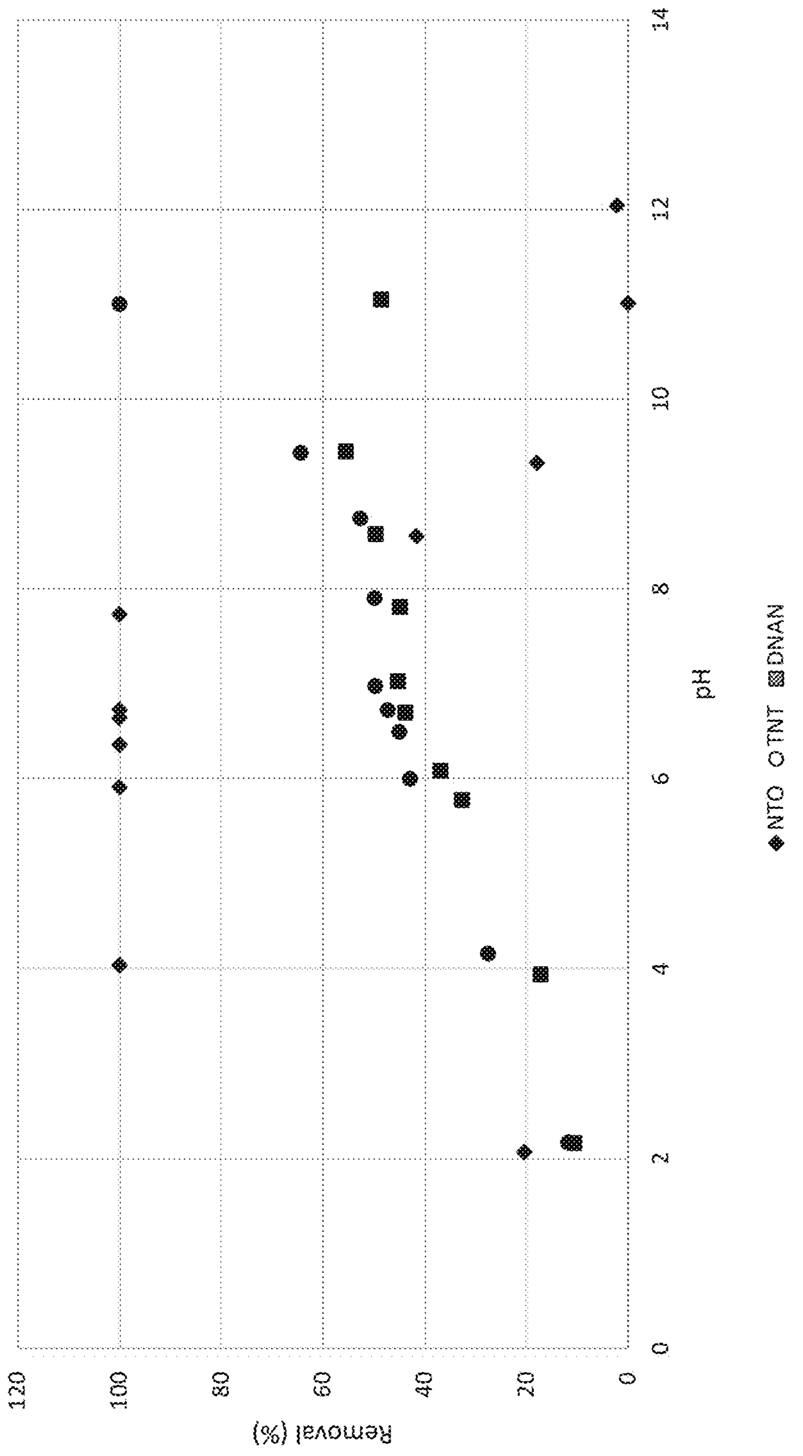
FIG. 7 illustrates example effects of pH level on the removal percentages of NTO, DNAN, and TNT by AFC material.

FIG. 7 illustrates example effects of pH level on the removal percentages of NTO, DNAN, and TNT by AFC material.

The AFC material (in a quantity of 100 grams) extracted nitrotriazolone (NTO), 2,4-dinitroanisole (DNAN), or trinitrotoluene (TNT) individually from solutions with a volume of 10 mL, a concentration of 1 mg/L (1 ppm), and one of eleven pH levels between 2 and 12. additional AFC functionalized with AM1 was produced. Sodium hydroxide (NaOH) and hydrochloric acid (HCl) controlled pH levels. The greatest adsorption and removal of munitions compounds occurs at a neutral pH; alkaline hydrolysis of TNT and DNAN occurs at high pH and skews the data.

Further experimentation showed that when the pH was lowered to 2 after adsorption at a neutral pH occurred, 67% of the NTO desorbed into solution. However, DNAN and TNT did not desorb at this pH. The experiment was repeated for NTO such that the pH was raised to 12 after adsorption at a neutral pH, and 77% of the NTO was desorbed. This experiment was not conducted for DNAN and TNT because alkaline hydrolysis would skew the results.

Therefore, these results show than AFC can be regenerated by change in pH of the feed solution. NTO, specifically, can be desorbed into solution when the pH is lowered to 2 or raised to 12. This feature extends the life of the adsorbent and, because DNAN and TNT are not desorbed, further provides separation and purification of munitions constituents. This property has not been observed for other commonly used adsorbents.

Removal of PFASs

The above describes a munitions compound detection and removal apparatus that includes a delivery component containing a quantity of amine functionalized chitin (AFC) compound, which is comprised of a chitin molecule bound to at least one amine group. The delivery component is adapted to interface with a water sample and includes a viewable interface that displays a color correlated with the presence of a munitions compound. The delivery component may be a receptacle containing the quantity of AFC compound or a material infused with the AFC compound. The apparatus further includes a removal component for removing munitions compounds from a solution The removal component captures particles comprised of the AFC compound and the munitions compounds. The removal component may be a filter having a pore size of 0.45 microns or a filtration column. The AFC compound may include trace components such as tosyl molecules or ethylenediamine. The AFC compound may be a solid that has been formed by evaporating a substance containing DMSO, tosyl chitin, DMF, ethylenediamine, and triethylamine.

The apparatus can be used for removing PFASs. Experiments have been performed using a similar method as described above for removing munitions compounds. For example, the AFC material comprised of chitin and ethylenediamine is used as a renewable adsorbent for perfluorooctanoic acid (PFOA), which is one of the most concerning PFAS materials currently in the environment. In specific experiments, when AFC is exposed to PFOA in solution at neutral or unadjusted pH, no color change is observed. Nonetheless, the apparatus and method prove effective in removing PFOA in such experiments.

FIG. 8 summarizes the AFC materials and methods used in specific experiments for removing PFOA in solutions. The adsorbent mass of the AFC adsorbent is 34 mg and the adsorbate volume of the adsorbate PFOA is 34 mL. The adsorbate concentrations include 0.25 μg/L (ppb), 0.5 ppb, 5 ppb, 100 ppb, and 250 ppb. Three replicates are analyzed for each adsorbate-adsorbent mixture. The mixtures are stored in 40-mL glass vials and agitated for at least 24 hours. Sample concentrations are quantified via Liquid Chromatography-Mass Spectrometry (LC-MS) at calibration of 0.05-500 ppb.

Figure 9:
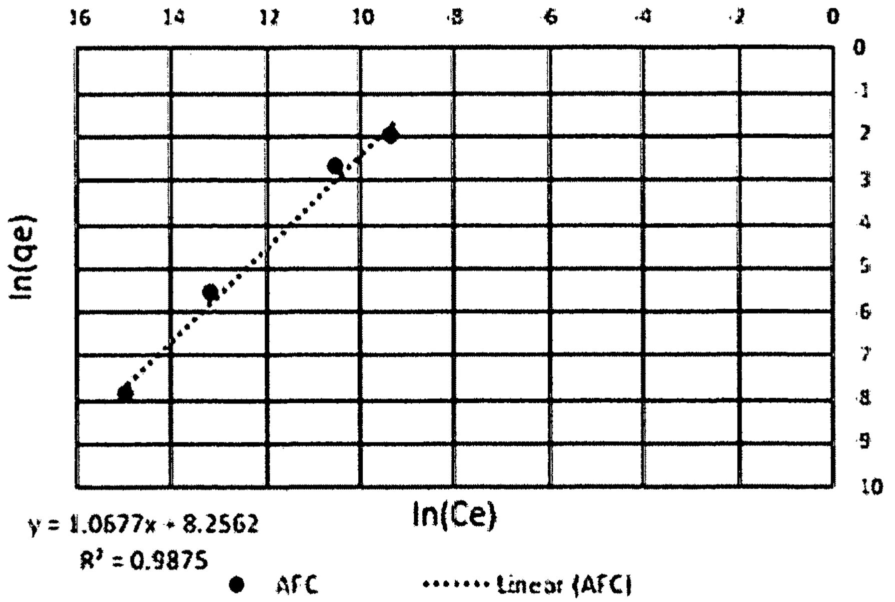
FIG. 9 summarizes the performance and results of the specific experiments for removing PFOA in solutions, including (A) a plot of the Freundlich model for removal and (B) a plot of removal percentages at varying concentration levels of PFOA.
Figure 9:
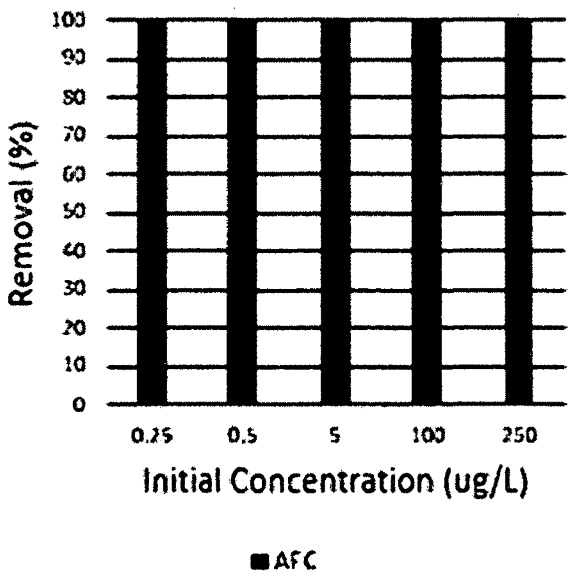

FIG. 9 summarizes the performance and results of the specific experiments for removing PFOA in solutions, including (A) a plot of the Freundlich model for removal and (B) a plot of removal percentages at varying concentration levels of PFOA. The Freundlich model for removal is $q_e=K_f C_e^{1/n}$ where $K_f$ is the Freundlich constant for adsorption capacity and n is the empirical constant for adsorption intensity. The AFC has the following performance characteristics: Kf ((mg/g)*(L/mg)^1/n of 3851.4, 1/n of 1.07, Target $C_e$ (mg/L) of 0.25, and Capacity (mg/g) of 876.6. A removal capacity of 8776.6 mg/g is among the highest observed for PFOA and other PFAS materials.

The plot in FIG. 9(A) of In($q_e$) versus In($C_e$) of four AFC data points shows a linear (AFC) relationship. Y=1.0677x+8.2562. $R^2$=0.9875.

The plot in FIG. 9(B) of Removal (%) versus Initial Concentration (μg/L) shows removal of nearly 100% PFOA (over 99% removal) using AFC in the experiments regardless of concentration at concentration levels of 0.25, 0.5, 5, 100, and 250 μg/L (ppb). The AFC material (in a quantity of ______ grams) extracted PFOA individually from three separate solutions with a volume of ______ mL and varying concentrations of 0.25, 0.5, 5, 100, and 250 μg/L (ppb). Quantitative analysis via HPLC showed that AFC functionalized with amine group 1 (AM1, depicted in FIG. 1) removed approximately 100% of PFOA at different concentration levels from solution after 24 hours of exposure. The nearly 100% removal efficacy regardless of concentration levels is surprising and unexpected.

Embodiments of the invention can be manifest in the form of methods and apparatuses for practicing those methods.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the example methods set forth herein are not necessarily required to be performed in the order described, and the order of the steps of such methods should be understood to be merely illustrative and not limiting. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A method of removing a substance from a solution by adsorption, the method comprising: interfacing a delivery component containing a quantity of amine functionalized chitin (AFC) compound, said AFC compound comprising a chitin molecule bound to at least one amine group, as an adsorbent AFC compound with the solution containing the substance as an adsorbate substance; mixing the adsorbent AFC compound and the adsorbate substance in the solution for a period of time; and removing a mixture of the adsorbent AFC compound and at least a portion of the adsorbate substance from the solution, wherein the adsorbate substance comprises a munitions compound.

2. The method of claim 1, wherein the munitions compound includes TNT, DNAN, or NTO, the method further comprising: visually observing a color change of the adsorbent AFC compound upon interfacing with the adsorbate substance.

3. The method of claim 1, further comprising: visually observing any color change of the adsorbent AFC compound upon interfacing with the adsorbate substance; and correlating the observed color change with a corresponding adsorbate substance.

4. The method of claim 1, wherein the delivery component comprises a receptacle containing the quantity of AFC compound or a material infused with the AFC compound.

5. The method of claim 1, wherein the AFC compound includes tosyl molecules or ethylenediamine.

6. The method of claim 1, wherein the AFC compound includes a solid that has been formed by evaporating a substance containing dimethyl sulfoxide (DMSO), tosyl chitin, dimethylformamide (DMF), ethylenediamine, and triethylamine.

7. The method of claim 1, wherein mixing the adsorbent AFC compound and the adsorbate substance in the solution comprises agitating the adsorbent AFC compound and the adsorbate substance in the solution for the period of time.

8. The method of claim 1, wherein the mixture is removed by capturing particles comprised of the mixture of the adsorbent AFC compound and at least a portion of the adsorbate substance.

9. The method of claim 1, wherein the mixture is removed by filtration.

10. A method of removing a perfluoroalkyl or polyfluoroalkyl substance (PFAS) from a solution, the method comprising: interfacing a delivery component containing a quantity of amine functionalized chitin (AFC) compound said AFC compound comprising a chitin molecule bound to at least one amine group, as an adsorbent AFC compound with the solution containing the PFAS as an adsorbate PFAS; mixing the adsorbent AFC compound and the adsorbate PFAS in the solution for a period of time; and removing a mixture of the adsorbent AFC compound and at least a portion of the adsorbate PFAS from the solution.

11. The method of claim 10, wherein the delivery component comprises a receptacle containing the quantity of AFC compound or a material infused with the AFC compound.

12. The method of claim 10, wherein the AFC compound includes tosyl molecules or ethylenediamine or a solid that has been formed by evaporating a substance containing dimethyl sulfoxide (DMSO), tosyl chitin, dimethylformamide (DMF), ethylenediamine, and triethylamine.

13. The method of claim 10, wherein the PFAS comprises perfluorooctanoic acid (PFOA); and wherein removing the mixture comprises removing at least 99% of the PFOA from the solution.

14. A method of removing a munitions compound from a solution, the method comprising: interfacing a delivery component containing a quantity of amine functionalized chitin (AFC) compound, said AFC compound comprising a chitin molecule bound to at least one amine group, as an adsorbent AFC compound with the solution containing the munitions compound as an adsorbate munitions compound; mixing the adsorbent AFC compound and the adsorbate munitions compound in the solution for a period of time; and removing a mixture of the adsorbent AFC compound and at least a portion of the adsorbate munitions compound from the solution.

15. The method of claim 14, wherein the delivery component comprises a receptacle containing the quantity of AFC compound or a material infused with the AFC compound.

16. The method of claim 14, wherein the AFC compound includes tosyl molecules or ethylenediamine or a solid that has been formed by evaporating a substance containing dimethyl sulfoxide (DMSO), tosyl chitin, dimethylformamide (DMF), ethylenediamine, and triethylamine.

17. The method of claim 14, wherein the munitions compound includes TNT, DNAN, or NTO, the method further comprising: visually observing a color change of the adsorbent AFC compound upon interfacing with the adsorbate munitions compound.

* * * * *